United States Patent [19]

Matsuno et al.

[11] Patent Number: 5,253,728
[45] Date of Patent: Oct. 19, 1993

[54] STEERING CONTROL METHOD FOR A MOTOR VEHICLE WITH A DIFFERENTIAL

[75] Inventors: Kouji Matsuno, Kasakake; Toyohiko Mouri, Ohta, both of Japan

[73] Assignee: Fuji Jukogyo Kabushiki Kaisha, Tokyo, Japan

[21] Appl. No.: 928,776

[22] Filed: Aug. 13, 1992

[30] Foreign Application Priority Data

Aug. 26, 1991 [JP] Japan .................. 3-238808

[51] Int. Cl.$^5$ ............................................. B62D 6/00
[52] U.S. Cl. .................................. 180/140; 180/142; 364/424.05
[58] Field of Search ............... 180/140, 141, 142, 79, 180/79.1, 249; 364/424.05

[56] References Cited

U.S. PATENT DOCUMENTS

| | | | |
|---|---|---|---|
| 5,035,295 | 7/1991 | Leiber et al. | 364/424.05 X |
| 5,159,553 | 10/1992 | Karnopp et al. | 364/424.05 |
| 5,184,298 | 2/1993 | Imaseki et al. | 180/140 X |
| 5,195,037 | 3/1993 | Tezuka | 364/424.05 X |

FOREIGN PATENT DOCUMENTS

0415619A2  6/1991  European Pat. Off. .

*Primary Examiner*—Margaret A. Focarino
*Assistant Examiner*—C. Mattix
*Attorney, Agent, or Firm*—Beveridge, DeGrandi, Weilacher & Young

[57] ABSTRACT

A steering control method for a motor vehicle with a differential. The quantity and direction of a torque displacement in the state in which restricting means is locked are calculated. When the direction of the torque displacement is from an outside wheel to an inside wheel, a restricting torque is set at zero. On the other hand, when the direction of the torque displacement is from the inside wheel to the outside wheel, the ratio between the load displacement magnitudes of a front axle is calculated. A front axle driving torque is calculated from a transmission gear position, an engine speed and a throttle opening degree. The restricting torque is calculated so that a torque distribution to the inside and outside wheels may become substantially equal to a load distribution to them. The correction amount of a steering assist force is calculated from the restricting torque, and the mass offset of a wheel tire, the diameter of the wheel tire and a steering gear ratio. A hydraulic controller is driven on the basis of the restricting torque calculated above. A steering correction controller is driven on the basis of the correction amount of the steering assist force calculated above.

2 Claims, 4 Drawing Sheets

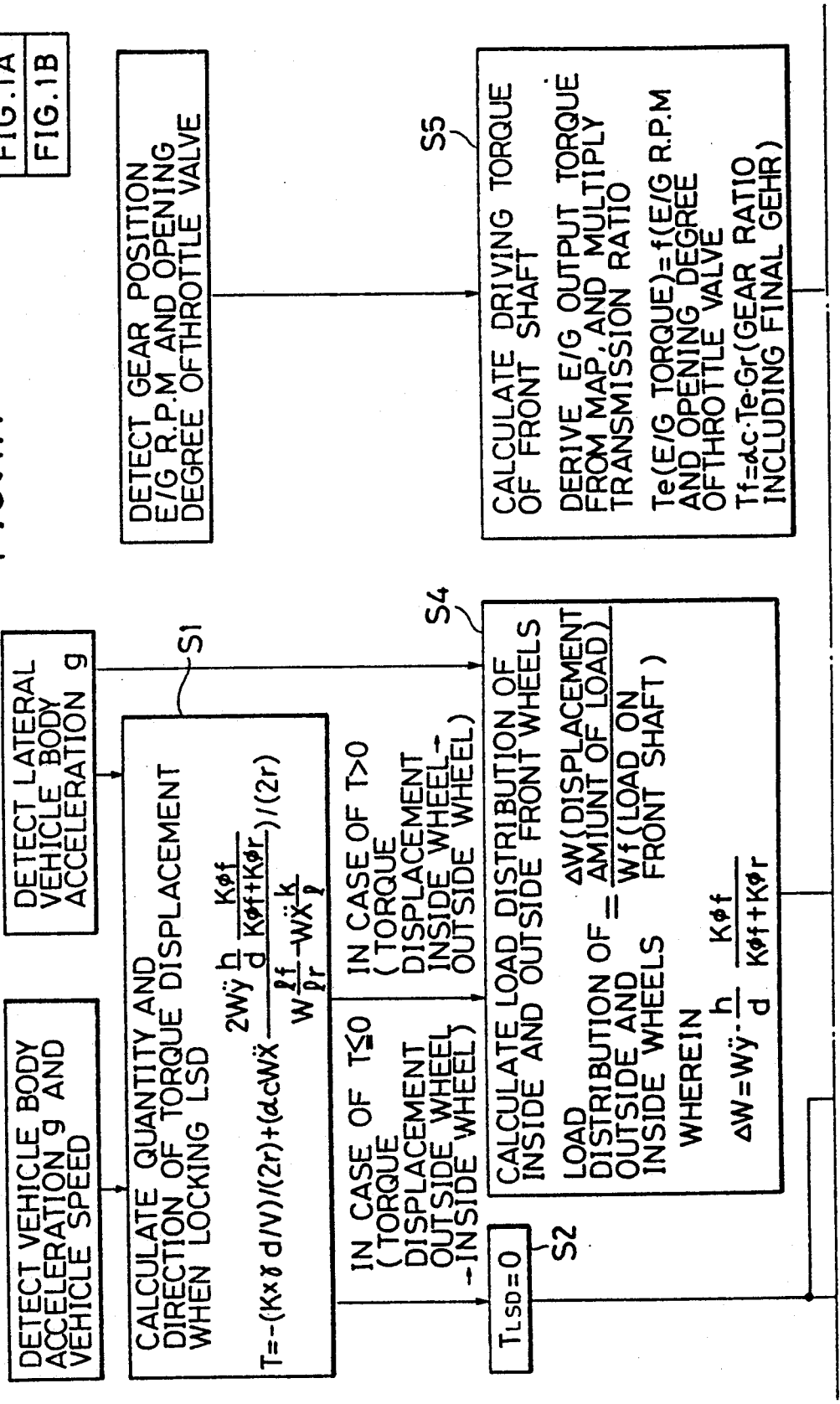

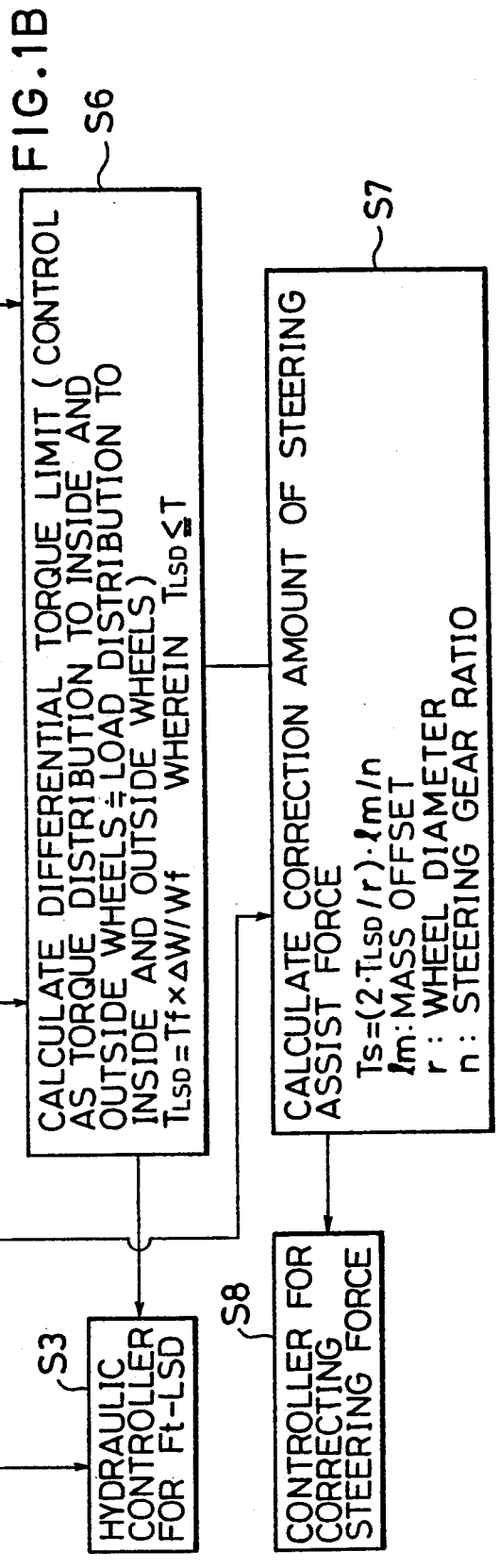

STEERING CONTROL METHOD FOR A MOTOR VEHICLE WITH A DIFFERENTIAL

BACKGROUND OF THE INVENTION

1. Field of the Invention

The present invention relates to a steering control method for a motor vehicle with a differential.

2. Description of the Prior Art

There has been already developed and laid open in the official gazette of Japanese Patent Application Laid-open No. 95939/1989 a driving force distribution control apparatus for a four-wheel drive vehicle having a transfer capable of altering a torque distribution to front and rear wheels, and restricting means capable of altering restricting forces to the right and left driving wheels; comprising longitudinal acceleration detection means for detecting the longitudinal acceleration of the motor vehicle, lateral acceleration detection means for detecting the lateral acceleration of the motor vehicle, discrimination means for discriminating the running condition of the motor vehicle on the basis of the value of the longitudinal acceleration detected by the longitudinal acceleration detection means and the value of the lateral acceleration detected by the lateral acceleration detection means, and driving force control means for attaining the optimum controls of the quantities of the torque distribution based on the transfer and the restricting forces based on the restricting means in accordance with the discriminated result of the running condition discrimination means.

It is widely known that, when the restricting means is actuated in dependency on the lateral acceleration in the turning condition of the motor vehicle in a front differential as in a central differential and a rear differential, the traction performance of the motor vehicle can be enhanced without sacrificing the turning performance thereof. In actuality, however, when a difference is produced between the driving forces of the right and left wheels by the actuation of the restricting means, a steering force or a counter steering force changes largely due to the mass offset of a suspension, namely, the offset between the axis of a kingpin and the center of a wheel tire. This incurs, not only the problem that the steering feeling of a driver is worsened, but also the problem that the driver fails to manipulate the steering wheel of the motor vehicle as desired in an extreme case.

SUMMARY OF THE INVENTION

A front differential employing a viscous coupling of comparatively small engaging force is the compromised result between both the performance of the vehicle itself (in the case where the driver manipulates the steering wheel firmly) and the steering feeling of the driver. The present invention has for its object to cope with the above problems without employing the expensive viscous coupling.

In one aspect of performance of the present invention, there is provided a steering control method for a motor vehicle having, an engine mounted on said motor vehicle, a differential provided between a left front wheel and a right front wheel for absorbing a speed difference of said left and right front wheels, restricting means mounted on said differential for controlling a torque distribution to said left and right front wheels, a steering wheel operatively connected to said wheels for steering said motor vehicle, an electric motor connected with said steering wheel for assisting an operation of said steering wheel, a torsion torque sensor connected to said steering wheel for detecting a torsion torque of said steering wheel and for producing a torsion torque signal, a vehicle speed sensor for detecting a vehicle speed and for generating a vehicle speed signal, an engine speed sensor for detecting an engine speed and for generating an engine speed signal, a throttle sensor for detecting an opening degree of a throttle valve in said engine and for producing a degree signal, a gear position sensor for detecting a position of selected gears and for generating a position signal, a lateral G sensor mounted on said motor vehicle for detecting a lateral acceleration and for generating a lateral G signal, and a longitudinal G sensor mounted on said motor vehicle for detecting a longitudinal acceleration and for generating a longitudinal G signal, an improvement of the control method which comprises the steps of deriving an amount and a direction of a torque displacement from said lateral and longitudinal G signals when said restricting means is locked; deactivating said restricting means when said direction of said torque displacement is from the outside wheel to the inside wheel; calculating a load distribution to said left and right wheels when said direction of said torque displacement is from said inside wheel to said outside wheel; computing a driving torque from a map storing data in a function of said position signal, said engine speed signal and said degree signal; determining a restricting torque from said load distribution and said driving torque; actuating said restricting means in accordance with said restricting torque; deciding a correction amount from said restricting torque and characteristic values of said motor vehicle; and correcting a assist force by said electric motor so as to improve a traction performance and to attain an optimum control of said steering wheel without fluctuation.

Owing to the above construction, the restricting torque is generated so as to bring the driving force distribution to the right and left front wheels being the driving wheels of the motor vehicle into agreement with the load distribution to the right and left front wheels, thereby to demonstrate the traction performance and steering stability to the utmost, and the steering force fluctuation ascribable to the torque restriction can be corrected.

BRIEF DESCRIPTION OF THE DRAWINGS:

FIGS. 1(A) and 1(B) are a flow chart showing an example of a control aspect in the present invention;

FIGS. 4(A) and 4(B) are explanatory views for finding the relationship among the driving forces of the inside and outside wheels and a steering assist force at the turn, in which FIG. 4(A) is a plan view, while FIG. 4(B) is an elevational view.

PREFERRED EMBODIMENT OF THE INVENTION:

Now, an embodiment of the present invention will be described with reference to the accompanying drawings.

Figure 2:
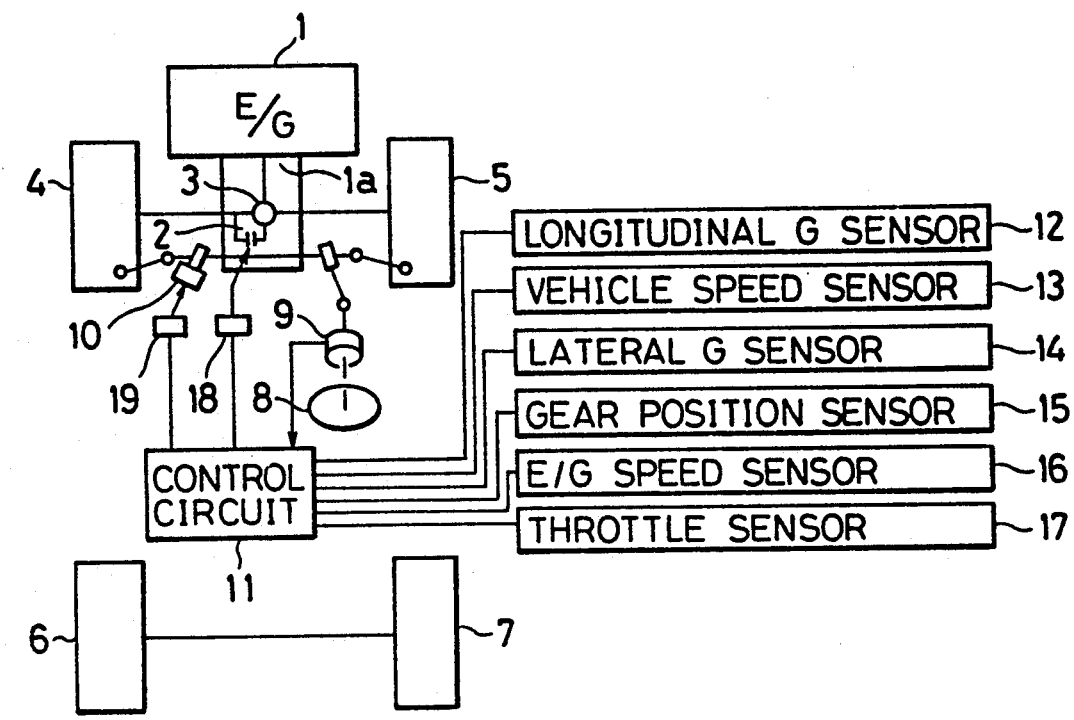
FIG. 2 is an explanatory plan view showing an embodiment of the present invention.

Referring to FIG. 2, numeral 1 indicates a power unit which is configured of an engine, a transmission, etc. and which has an output shaft 1a. The output shaft 1a drives a left front wheel 4 and a right front wheel 5 through a known front differential 3 equipped with ON/OFF type restricting mean 2 adapted to be hydraulically actuated. Numerals 6 and 7 represent rear wheels.

Shown at numeral 8 is a steering wheel. A known, front wheel steering mechanism extending from the steering wheel 8 to the front wheels 4, 5 is provided with a known, electric power steering system which includes a torsion torque sensor 9 for detecting the steering torque of the steering shaft of the steering wheel 8, and an electric motor 10 for applying a steering assist force corresponding to the steering torque detected by the torsion torque sensor 9.

Numeral 11 indicates a control circuit which performs the control of a restricting torque for the restricting means 2, and the correction control of the steering assist force for the electric motor 10 of the electric power steering system. The control circuit 11 calculates the difference and direction of a torque displacement between the inside and outside wheels with the restricting means 2 locked, from an acceleration in the longitudinal direction of the vehicle body (hereinafter, termed the "vehicle body acceleration g") detected by a vehicle-body longitudinal g sensor 12, a vehicle speed detected by a vehicle speed sensor 13, and an acceleration in the lateral direction of the vehicle body (hereinafter, termed the "vehicle-body lateral -g") detected by a vehicle-body lateral g sensor 14. When the direction of the torque displacement is from the outside wheel to the inside wheel, the control circuit 11 deactivates the restricting means 2. On the other hand, when the direction of the torque displacement between the inside and outside wheels is from the inside wheel to the outside wheel, the control circuit 11 calculates the load distribution of a front axle to the inside and outside wheels from the vehicle-body lateral g detected by the vehicle-body lateral g sensor 14. Subsequently, the control circuit 11 calculates a restricting torque with which a torque distribution to the inside and outside wheels becomes substantially equal to the load distribution to them, from the load distribution of the front axle to the inside and outside wheels calculated above and the driving torque of the front axle calculated from a transmission gear position detected by a gear position sensor 15, an engine speed detected by an engine speed sensor 16 and a throttle opening degree detected by a throttle opening sensor 17. Then, it applies a command signal corresponding to the restricting torque to a hydraulic controller 18 which controls the restricting means 2. Further, the control circuit 11 calculates the correction amount of a steering assist force from the restricting torque and the characteristic values of the motor vehicle, such as the mass offset of a wheel tire, the diameter of the wheel tire and a steering gear ratio. Then, it gives a command corresponding to the correction amount to a steering correction controller 19 which controls the electric motor 10 of the electric power steering system.

FIG. 1 is a flow chart showing the details of the control aspect of the control circuit 11. First, at a step S1, the quantity and direction of a torque displacement in the state in which the restricting means 2 is locked is calculated by the comparison between a torque displacement magnitude in the case of a small driving torque at the turn of the motor vehicle and a torque displacement magnitude in the case of a large driving torque.

The rotational speed of the turning outside wheel is higher than that of the inside wheel. Therefore, when the torque restriction is performed at the turn of the small driving torque, the outside wheel of the higher rotational speed undergoes a braking force, and the inside wheel of the lower rotational speed undergoes a driving force. Consequently, a turning moment based on the torque restriction becomes opposite to a turning direction.

More specifically, letting $Kx$ denote a driving (braking) stiffness and $S$ denote a slip factor (minus for a driving condition), the driving force $X$ which is generated in the wheel tire is expressed by $X = -Kx \cdot S$. The slip factor $S$ is represented by a simplified formula $S = Vr/(r\,\omega)\,1$ where $Vr$ denotes the speed of the wheel tire relative to a road surface, $r$ denotes the radius of the wheel tire, and $\omega$ denotes the rotational speed of the wheel tire. Besides, $\gamma$ is let denote the yaw rate of the motor vehicle, $\rho$ the turning radius thereof, $d$ the tread thereof, and $V$ the vehicle speed thereof. Then, the driving forces $Xo$ and $Xi$ of the outside wheel and inside wheel without the torque restriction are respectively expressed by the following equations:

$$Xo = -Kx \cdot So = -Kx\,\{Vr/((r\,\omega)) - 1\} \qquad (1)$$
$$\simeq -Kx\left\{\gamma\left(\rho + \frac{d}{2}\right)/V - 1\right\}$$

$$Xi \simeq -Kx\left\{\gamma\left(\rho + \frac{d}{2}\right)/V - 1\right\} \qquad (2)$$

Figure 3A:
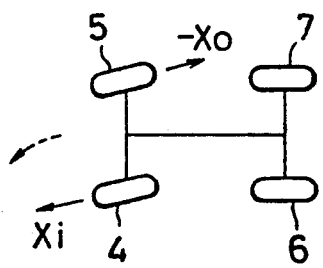
FIGS. 3(A) and 3(B) are explanatory views showing the directions of driving forces acting on inside and outside wheels at a turn, in which FIG. 3(A) corresponds to a small driving torque, while FIG. 3(B) corresponds to a large driving torque.

Accordingly, when the restricting means 2 is locked at the turn at which the driving torque does not become very large, the driving force $Xo$ of the outside wheel and that $Xi$ of the inside wheel act on the braking side and on the driving side as illustrated in FIG. 3(A), respectively. Therefore, a torque displacement T1 having a magnitude indicated by the following equation and being in the direction from the outside wheel to the inside wheel arises:

$$\begin{aligned}T1 &= (Xi + Xo)/(2\,\gamma) \\ &= \left[-Kx\left\{\gamma\left(\rho - \frac{d}{2}\right)/V - 1\right\}\right] + \\ &\quad \left[Kx\left\{\gamma\left(\rho + \frac{d}{2}\right)/V - 1\right\}\right] \\ &= (Kx \cdot \gamma \cdot d/V)/(2\,\gamma)\end{aligned} \qquad (3)$$

Subsequently, in a range in which the driving torque is large and the lateral vehicle body g is also large, the turning inside wheel has its load of ground contact decreased and therefore has its slip factor increased. Accordingly, the driving force $Xi$ of the inside wheel decreases, and also that $Xo$ of the outside wheel decreases with the decrease of the driving force of the inside wheel. In contrast, when the torque restriction is performed, the driving force Xo of the outside wheel can produce a driving force even after the decrease of the driving force Xi of the inside wheel. Thus, the driving force at the turn of the motor vehicle can be secured by the torque restriction.

That is, in the case of the large driving torque, the driving forces Xo and Xi as indicated by Eqs. (4) and (5) develop in the inside and outside front wheels in dependency on the loads of ground contact of these wheels, respectively:

$$Xo = \alpha c \cdot W \cdot \ddot{x} \frac{Wfo}{Wfo + Wfi} \quad (4)$$

where
  $\alpha c$: ratio of longitudinal torque distribution,
  W: weight of the vehicle body,
  $\ddot{x}$: longitudinal vehicle body g,
  Wfo: load of ground contact of the front outside wheel, and
  Wfi: load of ground contact of the front inside wheel.

$$Xi = \alpha c \cdot W \cdot \ddot{x} \frac{Wfi}{Wfo + Wfi} \quad (5)$$

Figure 3B:
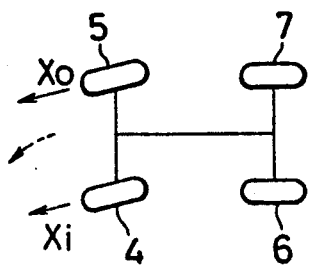

Accordingly, when the restricting means 2 is locked at the turn at which both the driving torque and the lateral vehicle body g are large, the driving force Xo of the front outside wheel becomes greater than that Xi of the front inside wheel as illustrated in FIG. 3(B). Therefore, a torque displacement T2 having a magnitude indicated by the following equation and being in the direction from the inside wheel to the outside wheel arises:

$$T2 = (Xo - Xi)/(2\gamma) \quad (6)$$
$$= \left( \alpha c \cdot W \cdot \ddot{x} \frac{Wfo - Wfi}{Wfo + Wfi} \right)/(2\gamma)$$

Assuming here that the roll axis of the motor vehicle lies on the ground, the load displacement $\Delta W = Wfo - Wfi$ between the front inside and outside wheels is represented by the following equation:

$$\Delta W = Wfo - Wfi = 2 \cdot W \cdot \ddot{y}\frac{h}{d} \frac{K\phi f}{K\phi f + K\phi r} \quad (7)$$

where
  $\ddot{y}$: lateral vehicle body g,
  h: height of the center of gravity,
  $K\phi f$: rolling stiffness of the front axle, and
  $K\phi r$: rolling stiffness of the rear axle.

Besides, letting I denote the wheel base of the motor vehicle and Ir denote the distance between the center of gravity and the rear axle, the load Wfo+Wfi of the front axle can be expressed by the following equation:

$$Wfo+Wfi = W\cdot Ir/l - W\cdot\ddot{x}\cdot h/l \quad (8)$$

where the first term indicates the load in the steady state of the motor vehicle, and the second term indicates the load displacement based on the acceleration.

By substituting Eqs. (7) and (8) into Eq. (6), accordingly, the torque displacement T2 in the direction from the inside wheel to the outside wheel is represented by the following equation:

$$T2 = \left( \alpha c \cdot W \cdot \ddot{x} \frac{2 \cdot W \cdot \ddot{y}\frac{h}{d} \frac{K\phi f}{K\phi f + K\phi r}}{Wfo + Wfi} \right)/(2\gamma) \quad (9)$$
$$= \left( \alpha c \cdot W \cdot \ddot{x} \frac{2 \cdot W \cdot \ddot{y}\frac{h}{d} \frac{K\phi f}{K\phi f + K\phi r}}{W\cdot Ir/l - W\cdot\ddot{x}\cdot h/l} \right)/(2\gamma)$$

Assuming in the above that a torque of the sum between the magnitude T1 expressed by Eq. (3) and the magnitude T2 expressed by Eq. (9) is displaced when the restricting means 2 is locked, a displacement torque T which is displaced in the direction from the inside wheel to the outside wheel is represented by the following equation:

$$T = -T1 + T2 \quad (10)$$
$$= -(Kx\cdot\gamma\cdot d/V)/(2\gamma) + $$
$$\left( \alpha c \cdot W \cdot \ddot{x} \frac{2 \cdot W \cdot \ddot{y}\frac{h}{d} \frac{K\phi f}{K\phi f + K\phi r}}{W\cdot Ir/l - W\cdot\ddot{x}\cdot h/l} \right)/(2\gamma)$$

In a case where the displacement torque T expressed by Eq. (10) is zero or minus, that is, in a case where the torque displacement arises in the direction from the outside wheel to the inside wheel, the restricting torque TLSD is set at zero as indicated in the block of a step S2. The information of the restricting torque TLSD=0 obtained at the step S2 is input to the hydraulic controller 18 for controlling the restricting means 2 as indicated in the block of a step S3, and it is also input to the steering correction controller 19 for calculating the correction amount of the steering assist force based on the electric motor 10 of the electric power steering system as indicated in the block of a step S8. Since, however, the restricting torque TLSD is zero, neither of the hydraulic controller 18 and the steering correction controller 19 produces an output. Accordingly, the restricting means 2 is not actuated, and the steering assist force based on the electric motor 10 is not corrected, either.

On the other hand, in a case where the displacement torque T expressed by Eq. (10) is plus, that is, where the torque displacement arises in the direction from the inside wheel to the outside wheel, the ratio $\Delta W/Wf$ of the load displacement magnitude to the load of the front axle is calculated from the load Wf of the front axle and the load displacement $\Delta W$ between the inside and outside front wheels evaluated with Eq. (10) at the step S1, as indicated in the block of a step S4.

Subsequently, at a step S5, the driving torque of the front axle is calculated from the transmission gear position detected by the gear position sensor 15, the engine speed detected by the engine speed sensor 16 and the throttle opening degree detected by the throttle opening sensor 17. More specifically, the driving torque Tf of the front axle is evaluated in such a way that an engine output torque TE is derived from the map data of the engine speed and the throttle opening degree, and that the engine output torque TE is multiplied by the longitudinal torque distribution ratio $\alpha c$ and a transmission ratio Gr including a final gear.

That is, TE=f(engine speed, throttle opening degree)

$$Tf = \alpha c \cdot TE \cdot Gr$$

Next, at a step S6, the value of the restricting torque TLSD with which the ratio ILSD/Tf of the restricting torque TLSD to the front axle driving torque Tf calculated at the step S5 becomes equal to the load displacement magnitude ratio $\Delta W/Wf$ found at the step S4 is obtained in accordance with a calculation indicated as Eq. (11). The restricting torque TLSD thus evaluated is input to the hydraulic controller 18 so as to actuate the restricting means 2.

$$TLSD = Tf \times \frac{\Delta W}{Wf} \quad (11)$$

where $TLSD \leq T$.

Next, at a step S7, the correction amount Ts of the steering assist force for canceling a steering force increase ascribable to the restricting torque TLSD evaluated at the step S6 is calculated.

Figure 4A:
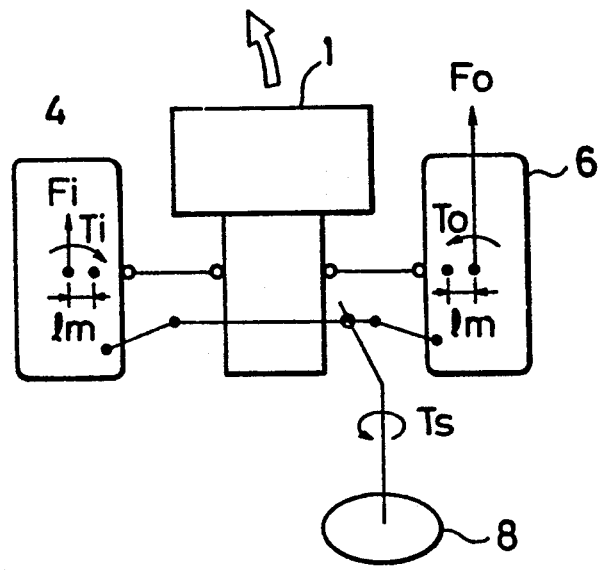

More specifically, when the motor vehicle turns to the left as illustrated in FIG. 4(A), the driving force acting on the outside wheel 5 is denoted by Fo, the driving force acting on the inside wheel 4 by Fi, the front axle driving torque by Tf, the restricting torque by TLSD, and the diameter of each wheel tire by r. Then, the driving forces Fo and Fi acting on the inside and outside wheels are respectively represented by the following equations:

$$Fo = (\tfrac{1}{2}Tf + TLSD)/r$$

$$Fi = (\tfrac{1}{2}Tf - TLSD)/r \quad (12)$$

Figure 4B:
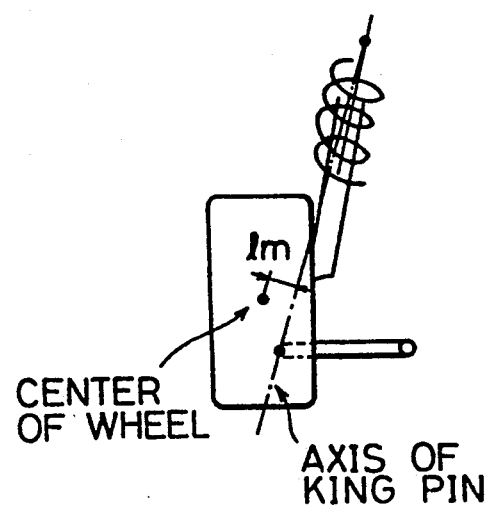

Here, as shown in FIGS. 4(A) and 4(B), the mass offset, namely, the distance between the center of a wheel tire and the axis of a kingpin is denoted by Im.

Then, torques To and Ti round the axes of the left and right kingpins are respectively represented by the following equations:

$$To = Fo \times Im$$

$$Ti = Fi \times Im \quad (13)$$

Accordingly, letting n denote the steering gear ratio, the correction amount of the steering assist force, namely, a torque Ts attendant upon steering is represented by the following equation:

$$TS = (To - Ti)/n = (Fo - Fi)Im/n \\ = (2 + TLSD/r) \times Im/n \quad (14)$$

Next, at the step S8, the correction amount Ts of the steering assist force is input to the steering correction controller 19 which controls the electric motor 10 of the power steering system for affording the steering assist force, and it cancels the torque attendant upon the steering due to the torque restriction. Therefore, the fluctuation of the steering force attributed to the generation of the restricting torque TLSD does not arise, and the driver can be prevented from feeling uneasy.

Incidentally, although the embodiment has referred to the example of application to the front-wheel drive vehicle, it is needless to say that the invention is also applicable to a four-wheel drive vehicle. Besides, as the power steering system, it is of course allowed to employ any desired system different from the electric type in the embodiment, such as a hydraulic type with or without an auxiliary electric motor.

As described above, according to the present invention, in a motor vehicle having differential restricting means and a power steering system; a quantity and a direction of a torque displacement between inside and outside wheels with said restricting means locked are derived from a longitudinal vehicle body acceleration, a lateral vehicle body acceleration and a vehicle speed; when said direction of said torque displacement is from said outside wheel to said inside wheel, said restricting means is deactivated; when said direction of said torque displacement between said inside and outside wheels is from said inside wheel to said outside wheel, a restricting torque with which a torque distribution to said inside and outside wheels becomes substantially equal to a load distribution of a front axle to said inside and outside wheels is calculated from said load distribution to said inside and outside wheels evaluated from said lateral vehicle body acceleration, and a front axle driving torque evaluated from a transmission gear position, an engine speed and a throttle opening degree; said restricting means is actuated in accordance with said restricting torque; and a correction amount of a steering assist force is calculated from said restricting torque and characteristic values of said motor vehicle, such as a mass offset of a wheel tire, a diameter of said wheel tire and a steering gear ratio, so as to correct said steering assist force with said correction amount; whereby the traction performance of the motor vehicle at the turn thereof can be enhanced, and a steering force fluctuation ascribable to the actuation of the restricting means can be suppressed. Thus, the present invention can bring forth great effects in practical use.

We claim:

1. A steering control method for a motor vehicle having, an engine mounted on said motor vehicle, a differential provided between a left front wheel and a right front wheel for absorbing a speed difference of said left and right front wheels, restricting means mounted on said differential for controlling a torque distribution to said left and right front wheels, a steering wheel operatively connected to said wheels for steering said motor vehicle, an electric motor connected with said steering wheel for assisting an operation of said steering wheel, a torsion torque sensor connected to said steering wheel for detecting a torsion torque of said steering wheel and for producing a torsion torque signal, a vehicle speed sensor for detecting a vehicle speed and for generating a vehicle speed signal, an engine speed sensor for detecting an engine speed and for generating an engine speed signal, a throttle sensor for detecting an opening degree of a throttle valve in said engine and for producing a degree signal, a gear position sensor for detecting a position of selected gears and for generating a position signal, a lateral G sensor mounted on said motor vehicle for detecting a lateral acceleration and for generating a lateral G signal, and a longitudinal G sensor mounted on said motor vehicle for detecting a longitudinal acceleration and for generating a longitudinal G signal, an improvement of the control method which comprises the steps of:

deriving an amount and a direction of a torque displacement from said lateral and longitudinal G signals when said restricting means is locked;

deactivating said restricting means when said direction of said torque displacement is from the outside wheel to the inside wheel;

calculating a load distribution to said left and right wheels when said direction of said torque displacement is from said inside wheel to said outside wheel;

computing a driving torque from a map storing data in a function of said position signal, said engine speed signal and said degree signal;

determining a restricting torque from said load distribution and said driving torque;

actuating said restricting means in accordance with said restricting torque;

deciding a correction amount from said restricting torque and characteristic values of said motor vehicle; and correcting an assist force by said electric motor so as to improve a traction performance and to attain an optimum control of said steering wheel without fluctuation.

2. The method according to claim 1, wherein said characteristic values are a mass offset and a diameter of a wheel tire, and a steering gear ratio.

* * * * *